United States Patent Office 2,791,608
Patented May 7, 1957

2,791,608
MANUFACTURE OF PHTHALOYL CHLORIDES

David R. V. Golding, Wilmington, Del., assignor to E. I. du Pont de Nemours and Company, Wilmington, Del., a corporation of Delaware No Drawing. Application January 13, 1955,
Serial No. 481,717

9 Claims. (Cl. 260—544)

This invention relates to processes for the manufacture of phthaloyl chlorides. More particularly, the invention is directed to the preparation of unsubstituted phthaloyl chlorides and to the preparation of ring chlorinated phthaloyl chlorides.

This application is a continuation-in-part of my copending application, Serial No. 398,623, filed December 16, 1953 and now abandoned.

Phthaloyl chlorides, such as for example, terephthaloyl chloride, are of importance commercially in the preparation of condensation polymers containing aromatic groups, such as polyamides or polyesters.

The preparation of phthaloyl chlorides has heretofore involved either the use of expensive chemicals, for example, phthalic acids, with thionyl chlorides, hexachloroxylenes, phosgene or phosphorus chlorides, or the chlorination of toluic acids.

I have now found that unsubstituted and ring chlorinated phthaloyl chlorides of the formula $$Cl_nC_6H_{4-n}(COCl)_2$$

where $n$ is a cardinal number of from zero to 4 can be prepared in excellent yield using a process which neither necessitates the use of a corresponding phthalic acid, nor requires separation or purification of the toluic acid prior to chlorination. Oxidation products of xylene including those that do not have titratable free acidity are converted en masse to substantially pure acid chloride by the process of my invention.

Broadly speaking, my process comprises a liquid-phase, partial oxidation of xylene, preferably at a temperature of at least 130° C., using an oxygen-containing gas such as air or oxygen, stopping the oxidation when the mole ratio of methyl:carboxyl groups lies in the range 50:1 to 0.5:1, removing the water formed in the oxidation and adjusting the composition of the oxidized mixture prior to chlorination with xylene or phthalic acid to insure that the mole ratio of methyl:carboxyl groups lies in the range 0.8:1 to 2.0:1.

If a non-ring-chlorinated product is desired, the adjusted fluid mixture is chlorinated at a temperature of from 130–270° C. until the amount of chlorine reacted is in the range of 3 moles per methyl group present at the start of the chlorination. To prepare mono-, di-, tri-, tetra-chlorophthaloyl chlorides and mixtures thereof, a chlorination catalyst is preferably added to the adjusted oxidized mixture and chlorination proceeds under the same conditions as already outlined for the unsubstituted phthaloyl chloride preparation.

The extent of ring-chlorination is conveniently followed by either the amount of chlorine reacted or the amount of hydrogen chloride evolved. In addition to the quantity of chlorine required to produce the phthaloyl chloride, one mole is required for each mole of mono-ring-chlorinated phthaloyl chloride desired. The same relationship holds for the hydrogen chloride evolved. Similarly, the reaction may be followed to any desired degree of ring-chlorination. In order to obtain a high yield of the mono-chlorinated product, for instance, it is preferred to carry the reaction short of completion (less than one mole of chlorine per each chlorine in the ring), separate the desired product by fractional distillation, and recycle the non-ring-chlorinated phthaloyl chloride.

It will be understood that xylene, phthalic acid, phthaloyl chloride and ring-chlorinated phthaloyl chlorides are used in a generic sense. The term xylene includes the three isomeric forms of xylene, namely, ortho, meta, and para, singly or any mixture thereof. The terms phthalic acid, phthaloyl chloride and ring-chlorinated phthaloyl chloride represent not only mixtures of isophthalic acid (isophthaloyl chloride), terephthalic acid (terephthaloyl chloride) and phthalic acid (phthaloyl chloride), but the individual isomers themselves. Accordingly, I have designated the particular isomer by its proper name in those instances where I am referring to a single species.

For the sake of simplicity the process of the invention will be further explained with particular reference to the manufacture of terephthaloyl chloride starting with p-xylene.

The partial, liquid-phase oxidation of p-xylene, and its oxidation products, with air or oxygen in the presence of a catalyst, preferably a xylene-soluble cobalt or manganese compound, is readily effected at a temperature of at least 130° C. Any of a wide variety of oxidation catalysts may be used. There may be used, for instance, carboxylates of heavy metals such as cobalt, chromium, iron, manganese, vanadium, cerium, lead and nickel. "Anions" which are effective with cobalt and some of the other heavy metals include napthenate, octoate, laurate, acetylacetonate, trimethyl butanoate, butyl phthalate, p-toluate, benzoate and nicotinate hydrochloride. As already indicated, the xylene-soluble cobalt compounds are preferred. Particularly preferred are cobalt naphthenate, cobalt octoate, and cobalt toluate.

The amount of the oxidation catalyst can vary over a wide range, say, from about 1 to 1000 p. p. m. by weight of the original xylene.

It will be understood that in order to obtain the benefits of my invention the oxidation should be stopped when the mole ratio of methyl:carboxylic groups lies in the range 50:1 to 0.5:1, preferably 20:1 to 0.9:1. The ratio of $CH_3$ to $COOH$ groups can be determined by analyzing an aliquot of the oxidation mixture which is substantially free of water. For purposes of this calculation, it is assumed that the oxidation mixture from which the aliquot is taken contains two components, "toluic acid" and "xylene," this being an approximation. The aliquot is analyzed for total acidity; this includes both free and saponifiable. The total acidity is calculated as "toluic acid." The remaining neutral portion of the aliquot is then assumed to be "xylene." Then the mole ratio of methyl groups to carboxyl groups is calculated as $$\frac{\text{Methyl}}{\text{Carboxyl}} = \frac{\text{Moles of ``toluic acid'' plus 2} \times \text{moles of ``xylene''}}{\text{Moles of ``toluic acid''}}$$

since each "toluic acid" contains one methyl and one carboxyl group and each xylene contains two methyl groups. This is an approximate method which is sufficient for operation of the process of the invention. However, a correction may be made, if desired, for the aldehyde groups present, by analyzing a separate aliquot for aldehyde groups and then calculating as tolualdehyde. In this event it is assumed that the substantially anhydrous aliquot consists of three components, "toluic acid," "xylene" and "tolualdehyde." Therefore, after the total acidity has been determined and calculated as "tolualdehyde," the remaining neutral portion of the aliquot is assumed to be "xylene." The ratio of methyl:carboxyl then is calculated as $$\frac{\text{Methyl}}{\text{Carboxyl}} = \frac{\text{Moles of "toluic acid" plus moles of "tolualdehyde" plus 2} \times \text{moles of "xylene"}}{\text{Moles of "toluic acid"}}$$

The above-outlined procedure is simple and suitable for practical operation. Its use permits adequate control. If so desired, however, the major constituents can be determined chemically by techniques well known to those skilled in the art. Such an elaborate procedure is not necessary for the purpose of carrying out the process of the invention.

The water formed during the oxidation must be removed prior to chlorination and is preferably removed during the partial oxidation. It may be removed by distillation.

It is preferred practice to remove the oxidation catalyst from the mixture of oxidation products, but the catalyst may be left in the mixture. It should be pointed out here by way of explanation, that it is never necessary to remove the oxidation catalyst when a ring-chlorinated phthaloyl chloride is being prepared. Although the oxidation catalyst also catalyzes the ring-chlorination, it is preferred to add additional catalyst in an amount of from 0 to several percent of the weight of the oxidation product, preferably 0.1 to 1% by weight of the oxidation product. Any of a variety of catalysts conventionally used for ring-chlorination may be employed. There can be used iron, zinc, antimony, cobalt, aluminum, and tin in the form of metals or salts.

Continuing now with my description of the invention with particular reference to terephthaloyl chloride manufacture, it will be understood that in the event the mole ratio of methyl to carboxyl groups in the compounds present in the mixture of products resulting from the partial oxidation is outside of the range of from 0.8 to 2.0, the composition of the mixture must be adjusted prior to chlorination so that the mole ratio of methyls (or equivalent): carboxyl (or equivalent) is 0.8:1 to 2.0:1, preferably 0.9:1 to 1.2:1.

This adjustment of the unpurified oxidation reaction mass so that it contains substantially one methyl group, or its equivalent, per carboxyl group, or its equivalent, is preferably done by removing or adding xylene. It can also be done by adding or removing phthalic acid. It will be understood that this adjustment can be effected by adding a mixture rich in carboxyl or methyl groups, whichever is desired. Removal of xylene or phthalic acid may be effected by any conventional method such as, for instance, distillation, decantation or the like.

The reaction mass may contain as its principal constituents the following:

Xylenes
Toluic acids
Phthalic acids
Methyl and carboxy benzaldehydes
Methylbenzyl toluates Adjustment of such a reaction mass to the above stated ratio is relatively straightforward.

For purposes of conversion to acid chlorides, an aldehyde group, —CHO, neither counts as a methyl group nor as a carboxyl group since chlorination converts the aldehyde directly to acid chloride. An ester group, —COOCH$_2$—, is considered equivalent to one methyl plus one carboxyl group. It will be understood that the aldehyde groups and the alcoholic portion of the ester groups require less chlorine in the chlorination step than do the methyl groups.

The next step in the process of the present invention is the chlorination of the adjusted oxidation mixture in a substantially fluid state. The chlorination temperature should be sufficiently high to maintain a fluid reaction mass. In practice, temperatures of about 130° C. are sufficient for this purpose.

It will be understood that lower temperatures may be used with inert solvents or with oxidation mixtures having melting points lower than those obtained by simple oxidation.

The maximum reaction temperature is not critical, being limited only by the decomposition point or boiling point of the reaction mass. In general, it is unnecessary to operate at temperatures above 270° C. and the preferred temperature range is from about 145 to 235° C.

The use of pressure is not necessary and the chlorination reaction can be carried out at atmospheric pressure if the reaction medium has a sufficiently high boiling point. However, it is in general convenient to operate in a closed vessel which avoids possible loss of chlorine until the pressure generated by the reactants and reaction products is at the reaction pressure, or under additional inert gas pressure if desired.

The presence of light in the chlorination is not necessary, although in some cases illumination with actinic or ultra-violet light may be beneficial especially at the lower reaction temperatures. Similarly, catalysts are not necessary but again can be employed. Suitable catalysts are those which generate free radicals such as the organic peroxides or the azonitriles. It is, of course, recommended to avoid the use of catalysts which favor the ring halogenation rather than side-chain halogenation, such as the metal halides, when phthaloyl chlorides without chlorine substituents in the benzene ring are desired.

Near the end of the chlorination, it is a preferred practice to add a small amount of sulfuric acid to catalyze the reaction of trichloromethyl groups and carboxyl groups to give acid chloride groups. The sulfuric acid accelerates this reaction markedly. Higher yields result.

It will be understood that any Friedel-Craft type catalyst will function after free chlorine has been removed from the reaction mass to achieve the same results as those obtained with sulfuric acid. Among the Friedel-Craft type catalysts that can be employed are zinc chloride, aluminum chloride and ferric chloride.

The reaction system should be anhydrous since the presence of water causes side reactions during chlorination. Solvents are not necessary by may be employed. The reaction proceeds satisfactorily without solvents, particularly when efficient agitation is used.

A solvent unreactive with the reactants and the reaction products may be used, for example, carbon tetrachloride or chlorinated benzenes. The reaction product itself, that is, the aromatic dicarboxylic acid chloride, is a good reaction medium.

The amount of chlorine used in relation to the methyl groups present initially in oxidation mixture should be in the range of 3 moles per initial methyl group. A slight to moderate excess of chlorine over the quantity mentioned can be used. It is preferred not to use large excesses of it in order to minimize the possibility of ring-chlorination. If desired, the chlorination can be stopped somewhat short of 3 moles and after distillation the underchlorinated materials may be recycled to subsequent chlorination.

The chlorine may be introduced gradually to the mixture as the reaction proceeds. When the chlorination is carried out in a closed vessel, its progress can be followed by the formation of hydrogen chloride. The end of the reaction coincides with a sharp decline in rate of evolution of hydrogen chloride.

After chlorination is complete, the reaction mixture is distilled. The principal product is terephthaloyl chloride.

If the ratio of methyl:carboxyl groups in the unchlorinated starting material is not exactly 1:1, there are some by-products. If excess carboxyl groups are present, anhydride formation may occur. If excess methyl groups are present, compounds such as

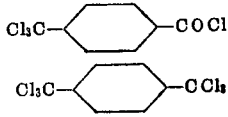

may be found in the chlorinated mixture. In the event of underchlorination, a compound of the following type

may also be present in the mixture.

Except for high molecular weight polymers, for example, polymeric anhydrides, the resulting products are distillable and can be recycled.

Conversion of the anhydride type materials in the tar residue to terephthaloyl chloride can be effected as follows: The product is distilled from the final chlorinator. The tar residue is thereby concentrated. Excess trichloromethyl groups and an adequate sulfuric acid concentration are maintained in a system containing the concentrated tarry residue until all terephthaloyl chloride is "squeezed" (in a chemical sense) from the tar. In a continuous process this is operated as a recycle of the residue.

A slight excess of methyl groups in the reaction mass is believed beneficial since the excess may prevent anhydride formation. The reaction between trichloromethyl groups and anhydride groups is known to occur to form acid chlorides in the presence of sulfuric acid at 130–270° C. An excess of methyl groups can be maintained by recycle of

to the chlorinator which an oxidation product with a methyl-carboxyl ratio of one is fed thereto.

The principal reaction product, terephthaloyl chloride, can be purified by distillation, crystallization, or fractional freezing, according to known procedures.

While the invention has been illustrated with particular reference to the preparation of terephthaloyl chloride by a process in which p-xylene is partially oxidized and the oxidation products chlorinated, it will be understood that the invention may also be practiced using ortho-xylene and meta-xylene to produce principally o-phthaloyl chloride and isophthaloyl chloride respectively.

The following examples are illustrative of the process of the invention:

*Example 1*

This example illustrates the conversion to phthaloyl chloride of xylene oxidation products having both titratable free acidity and saponifiable acidity.

2370 parts of xylene, predominantly the p-isomer, containing 100 p. p. m. of cobalt (added as a solution of cobalt octoate) is partially oxidized at the atmospheric boiling point of xylene for a period of 136 minutes. The temperature of the reaction mixture when the oxidation is stopped is 136° C.

During the partial oxidation 63 parts of water, which corresponds to about 0.158 mole of water per mole of xylene, are removed.

The oxidation mixture is preferably washed free of cobalt. A substantial quantity of the p-xylene, which was not oxidized, is recovered by distillation. The residue which is essentially free of xylene and consists of 467 parts contains titratable free acidity. This free acidity, when calculated as toluic acid, corresponds to 69% toluic acid. The total free and saponifiable acidity when determined and then calculated as toluic acid corresponds to 90% toluic acid.

If the difference between the free and saponifiable acidity is assumed to be an ester and is calculated as p-methylbenzyl p-toluate, it corresponds to 37% ester. This is a reasonable assumption made in calculating the free and saponifiable acidities. Thus, the figures account for all the material (467 parts) within the errors of the analyses and approximations.

The calculated number of carboxyl groups, both free and combined, in 100 parts of the resulting mixture is then 90 parts or 0.661 mole. Assuming 37% ester as above, there is 0.154 mole of ester. Hence the total number of methyl groups or their equivalent is $0.661+2(0.154)=0.969$.

The ratio $CH_3/COOH=0.969/0.661=1.46$.

A 37 part portion of the above oxidation product containing 0.187 mole of free acid and 0.245 mole of total acid is chlorinated for a period of 340 minutes at a temperature in the range of from 176–183° C. A drop of sulfuric acid is added after 215 minutes of chlorination.

A portion of the resulting chlorinated product (59.6 parts) is distilled to give 57 parts of product which boils at 146–174° C. at 34 mm. pressure. The acid chloride equivalent weight of this mixture is 132. This corresponds to 0.432 mole of acid chloride actually recovered of 0.442 mole theoretically recoverable.

It is believed that one carboxyl group gives rise to 2 acid chloride groups.

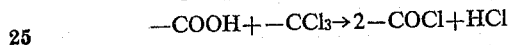

Hence, $0.442/2=0.221$, that is to say, there are obtained more acid chloride groups than are accountable for on the basis of the titratable free acidity.

$0.221/0.245=0.903$ or more than 90% of the total acidity is recovered as acid chloride groups. At least $(0.221-0.187)=0.034$ mole of saponifiable acidity has been converted to phthaloyl chloride.

To a portion of the oxidation mixture prepared as above-described, there is added 0.1 percent by weight of ferric chloride. Chlorination of the mixture is begun in the manner described above but is continued until an additional mole of chlorine per mole of toluic acid reacts and an additional mole of hydrogen chloride per mole of toluic acid is liberated. The resulting product contains mainly monochloroterephthaloyl chloride. Minor amounts of terephthaloyl chloride and more completely chlorinated compounds are also present. These compounds can be separated by fractional distillation or other convenient means.

*Example 2*

This example illustrates the preparation of terephthaloyl chloride from the mixture of products obtained by partial oxidation of xylene. The principal by-product is p-trichloromethylbenzoyl chloride. The product chlorinated has a ratio of $CH_3$ to COOH groups greater than one.

To a flask provided with a gas distributing stirrer and condenser with a water separator, there is added 1500 parts, 14.1 moles of substantially pure p-xylene and 0.008 mole of a cobalt catalyst consisting essentially of cobaltous p-toluate.

The catalyst is prepared by boiling a mixture of 2.0 parts of cobaltous acetate tetrahydrate and 2.2 parts of p-toluic acid in a few mls. of p-xylene to distill out most of the acetic acid.

The xylene is oxidized at the boiling point of the mixture by passing in oxygen through the gas dispersion stirrer. Water is removed as it distills over and is separated in the water separator. After oxidizing for a period of 317 minutes, 116 parts of aqueous layer (about 6.45 moles) separates. By this time the reaction temperature has risen from 132° C. to about 142° C.

The reaction mixture is then cooled. 500 parts of water and 18 parts of 1.00 N hydrochloric acid are added. The resulting mixture is heated to reflux temperature. Most of the water layer, which contains a substantial amount of the cobalt, is siphoned off. The organic layer is cooled and then washed with water. A liquid organic layer of 810 parts, and a wet, solid organic layer of 671 parts are obtained.

A mixture of the solid and liquid comprising substantially half of the above liquid and solid is distilled at atmospheric pressure in order to concentrate to a composition approximating toluic acid.

Following the distillation, a residue of 422 parts containing 2.51 moles, 81.4% by weight, of free acid, as determined by titration, remains in the chlorinator.

The chlorinator consists of a stirred, glass tubular reactor with a chlorine inlet near the stirrer. It is heated by infrared lamps.

Chlorine is passed into the stirred reaction mixture for a period of 918 minutes at a temperature of from 142–230° C., mostly 165–226° C. The chlorination is complete in about 900 minutes. About 0.1 ml. of concentrated sulfuric acid is then added to catalyze the conversion of any remaining carboxyl groups to acid chloride groups.

The chlorinated product weighing about 679 parts is distilled at reduced pressure to give 633 parts of product having the following fractions:

| Fraction | B. P. (° C.), 19 mm. | Wt., parts | Equiv. Wt.[a] as Acid Chloride | Ratio:[b] Sapon. Cl, Acid Cl | Remarks |
|---|---|---|---|---|---|
| 1 | 145–150 | 87 | 113.5 | 1.13 | Recryst., M. P. 82°.[c] |
| 2 | 150–155 | 337 | 117 | 1.39 | Methylester, M. P. 138°. |
| 3 | 155–162 | 116 | 143 | 1.47 | Crude, M. P. 75°. |
| 4 | 165–172 | 93 | 235 | 3.48 | |
| Residue | | 40 | | | Liquid[d] {Methyl ester, M. P. 49.5 Analysis 41.36, 41.63% Cl. |

[a] Determined by solution in methanol and titration of the liberated HCl.

[b] Saponifiable chloride determined by refluxing in alkali, neutralization, filtration and titration of chloride in the filtrate. Theoretical ratio saponifiable chloride/acid chloride is 1.00 for terephthaloyl chloride and 4.00 for p-trichloromethylbenzoyl chloride.

[c] Terephthaloyl chloride M. P. is reported to be various values in the range 77–84° C. Dimethyl terephthalate is reported to melt at 140° C. Mixed melting point of the recrystallized acid chloride above, M. P. 82° C., with an authentic sample of terephthaloyl chloride showed no depression.

[d] p-Trichloromethylbenzoyl chloride is reported to be a liquid at room temperature. Methyl p-trichloromethyl-benzoate is reported to melt at 55° C. [J. Chem. Soc. 121, 2202 (1902)]. The theoretical chlorine content of this ester is 42.0%. Hence the fraction B. P. 165-172/19 mm. is mostly p-trichloro methylbenzoyl chloride.

I claim:

1. A process for preparing a phthaloyl chloride of the formula $$Cl_nC_6H_{4-n}(COCl)_2$$

where $n$ is a cardinal number of from zero to 4 comprising contacting an oxygen-containing gas with xylene in liquid phase, continuing the oxidation until the mole ratio of methyl:carboxyl groups is from 50:1 to 0.5:1, removing the water formed in the oxidation, adjusting the mixture of oxidation products with a member of the group consisting of xylenes and phthalic acids, whereby said mole ratio is from 0.8:1 to 2.0:1, and contacting the adjusted fluid composition with chlorine until the chlorine consumed is at least about 3 moles but not more than 7 moles per methyl group present in the composition at the start of chlorination.

2. A process for the preparation of phthaloyl chlorides comprising contacting an oxygen-containing gas with xylene in liquid phase and in the presence of a heavy metal catalyst, continuing the oxidation until the mole ratio of methyl:carboxyl groups is from 50:1 to 0.5:1, removing the water formed in the oxidation, adjusting the mixture of oxidation products with a member of the group consisting of xylenes and phthalic acids, whereby said mole ratio is from 0.8:1 to 2.0:1, and contacting the adjusted fluid composition with chlorine, adding a catalyst selected from the group consisting of Friedel-Craft type catalysts and sulfuric acid, and continuing chlorination until the chlorine consumed is at least about 3 but not exceeding 7 moles per methyl group present in the composition at the start of chlorination.

3. A process for the preparation of phthaloyl chlorides comprising contacting an oxygen-containing gas with xylene in liquid phase and in the presence of a heavy metal catalyst, continuing the oxidation until the mole ratio of methyl:carboxyl groups is from 50:1 to 0.5:1, removing the water formed in the oxidation, adjusting the mixture of oxidation products with a member of the group consisting of xylenes and phthalic acids, whereby said mole ratio is from 0.8:1 to 2.0:1, and contacting the adjusted fluid composition with chlorine at a temperature of from 130° to 270° C. in the presence of a catalytic amount of sulfuric acid until the chlorine consumed is substantially 3 moles per methyl group present in the composition at the start of chlorination.

4. A process for the preparation of phthaloyl chlorides comprising contacting an oxygen-containing gas with xylene in liquid phase and in the presence of a heavy metal catalyst at a temperature of at least 130° C., continuing the oxidation until the mole ratio of methyl:carboxyl groups is from 50:1 to 0.5:1, removing the water formed in the oxidation, adjusting the mixture of oxidation products with a member of the group consisting of xylenes and phthalic acids, whereby said mole ratio is from 0.8:1 to 2.0:1, and contacting the adjusted fluid composition with chlorine at a temperature of from 130° to 270° C. until the chlorine consumed is substantially 3 moles per methyl group present in the composition at the start of chlorination, a catalytic amount of sulfuric acid having been added to said composition near the end of the chlorination.

5. A process for the preparation of phthaloyl chlorides comprising contacting an oxygen-containing gas with xylene in liquid phase at a temperature of at least 130° C., continuing the oxidation until the mole ratio of methyl:carboxyl groups is from 20:1 to 0.9:1, distilling off the water formed in the oxidation, adjusting the mixture of oxidation products with a member of the group consisting of xylenes and phthalic acids, whereby said mole ratio is from 0.9:1 to 1.2:1, contacting the adjusted composition with chlorine at a temperature of from 130° to 270° C., adding a catalytic amount of sulfuric acid to the chlorination mixture, and continuing chlorinating until the chlorine consumed is substantially 3 moles per methyl group present in the composition at the start of chlorination.

6. A process for the preparation of phthaloyl chlorides comprising contacting an oxygen-containing gas with xylene in liquid phase and in the presence of a cobalt carboxylate at a temperature of at least 130° C., continuing the oxidation until the mole ratio of methyl:carboxyl groups is from 20:1 to 0.9:1, distilling off the water formed in the oxidation, adjusting the mixture of oxidation products with a member of the group consisting of xylenes and phthalic acids, whereby said mole ratio is from 0.9:1 to 1.2:1, contacting the adjusted composition with chlorine at a temperature of from 130° to 270° C., adding a catalytic amount of sulfuric acid to the chlorination mixture, and continuing chlorinating until the chlorine consumed is substantially 3 moles per methyl group present in the composition at the start of chlorination.

7. A process as set forth in claim 1 wherein xylene is substantially pure p-xylene.

8. A process as set forth in claim 1 wherein the mixture of oxidation products contains a methylbenzyl toluate.

9. A process as set forth in claim 6 wherein xylene is substantially pure p-xylene and the mole ratio of methyl to carboxyl groups in the composition chlorinated is substantially equal to one.

References Cited in the file of this patent

UNITED STATES PATENTS

| | | |
|---|---|---|
| 2,245,528 | Loder | June 10, 1941 |
| 2,525,722 | Rabjohn | Oct. 10, 1950 |
| 2,676,187 | Foster et al. | Apr. 20, 1954 |